United States Patent
Vullers et al.

(10) Patent No.: US 7,352,522 B2
(45) Date of Patent: Apr. 1, 2008

(54) CONTROL MEANS AND METHOD OF CONTROLLING A CURRENT THROUGH A COIL

(75) Inventors: Rudolf Johan Maria Vullers, Eindhoven (NL); Willem Johannes Antonia Geven, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/573,554

(22) PCT Filed: Sep. 28, 2004

(86) PCT No.: PCT/IB2004/051889

§ 371 (c)(1),
(2), (4) Date: Mar. 27, 2006

(87) PCT Pub. No.: WO2005/034113

PCT Pub. Date: Apr. 14, 2005

(65) Prior Publication Data

US 2007/0053132 A1    Mar. 8, 2007

(30) Foreign Application Priority Data

Oct. 2, 2003    (EP) ................... 03103646

(51) Int. Cl.
*G11B 15/18* (2006.01)
*G05B 11/01* (2006.01)
*G05B 9/02* (2006.01)
*G05D 3/12* (2006.01)
*H02H 5/04* (2006.01)
*H01H 47/00* (2006.01)

(52) U.S. Cl. ................ 360/69; 700/21; 700/79; 700/293; 700/299; 361/93.8; 361/103; 361/140

(58) Field of Classification Search ........... 700/21–22, 700/79, 286, 292, 293, 299; 361/93.8, 103, 361/140; 360/69, 75, 97.02, 31, 234.7; 336/179

See application file for complete search history.

(56) References Cited

U.S. PATENT DOCUMENTS 6,594,104 B2 * 7/2003 Tokuyama et al. ....... 360/78.02
2001/0055175 A1 * 12/2001 Tokuyama et al. ........... 360/69

FOREIGN PATENT DOCUMENTS

WO    WO01/82299    11/2001

OTHER PUBLICATIONS

Disk read-and-write head; Wikipedia; 2 pages.*

* cited by examiner

*Primary Examiner*—Ronald Hartman, Jr.
(74) *Attorney, Agent, or Firm*—Michael E. Belk

(57) ABSTRACT

Method of controlling a current through a coil (L) for the generation of a magnetic field (H) in which: a parameter is determined which is a measure for the value of the resistance ($R_L$) of the coil (L), the current ($I_L$) through the coil (L) is controlled by data (DS) delivered by a data control circuit (DSS), and a stop data signal (SPD) is delivered to the data control circuit (DSS) for (at least) temporarily stopping the control of the current ($I_L$) when the parameter exceeds a certain limit.

9 Claims, 6 Drawing Sheets

IMNS

CONTROL MEANS AND METHOD OF CONTROLLING A CURRENT THROUGH A COIL

The invention relates to an electronic circuit comprising control means for controlling a coil current through a coil for the generation of a magnetic field.

Such an electronic circuit is described in the international patent application IB 03/02864 from the present applicant which was not yet published at the priority date of the present patent application.

FIG. 1 is identical to the first Figure from patent application IB 03/02864 and shows the principle of control means CMNS for controlling a coil current $I_L$ used in an appliance A such as a magneto-optical disc recording/playback device. These control means CMNS comprise current means IMNS with a first input terminal 3 for receiving an input signal S and a second input terminal 4 for receiving a setting reference signal SR, and first and second output terminals 1 and 2 for providing a coil current $I_L$ through a coil L which is connected between the output terminals 1 and 2. The series resistance $R_L$ of the coil L is indicated with broken lines. The control means CMNS further comprise detection means DMNS for measuring a coil voltage $V_L$ between the terminals 1 and 2, supplying the setting reference signal SR in response thereto.

The operating principle of the invention of patent application IB 03/02864 is as follows. Writing of information onto a magnetic (optical) disc in the appliance A takes place through the generation-of positively and negatively directed magnetic field strengths H originating from the coil L. The magnetic field H is generated by means of the control of the coil current $I_L$ through the coil L. The coil current $I_L$ is supplied by the current source I. The information is contained in the input signal S, which is a digital binary signal. As long as the temperature of the coil L is lower than a maximum admissible temperature, both the current direction and the amplitude of the coil current $I_L$ are defined in principle by the input signal S. Once the temperature of the coil L has become equal to the maximum admissible temperature, however, the detection means DMNS ensure by means of generation of the setting reference signal SR that the coil current $I_L$ can increase no further both in positive and in negative direction. This serves to prevent the coil L from burning through.

Although the coil, i.e. the magnetic head, is protected against overheating by an electronic circuit as described in patent application IB 03/02864, the application has its limitations. In fact, the required magnetic field strength may be higher than the magnetic field strength that can be generated at the maximum temperature of the magnetic head in some applications, even at an optimum cooling of the magnetic head.

It is accordingly an object of the invention to provide an electronic circuit for controlling a coil current through a coil in which a high magnetic field strength can be generated.

According to the invention, the electronic circuit mentioned in the opening paragraph is for this purpose provided with a data control circuit coupled to the control means for supplying data to the control means, wherein the control means comprise detection means for determining a parameter which is a measure for the resistance value of the coil, and for providing a temperature stop signal for at least temporarily stopping the supply of data to the control means when the parameter has exceeded a certain value.

The invention is based on the recognition that known electronic circuits comprising control means for controlling a coil current through a coil for the generation of a magnetic field such as described, for example, in patent application IB 03/02864 involve the assumption that the data supplied to the control means are continuously present. Given a continuous data stream, the coil (or the magnetic head) will reach a certain temperature after some time. This temperature corresponds to a certain value of the coil current. The value of the coil current, however, is dependent on the degree of cooling. The better the cooling, the higher the coil current may be. Starting from an initial state in which the coil current is zero and the coil temperature is equal to the ambient temperature, or even lower in the case of cooling of the coil, it will take a considerable time before the coil reaches its final temperature, starting from the moment the supply of a data stream through the coil has started. The temperature will rise as time passes until the temperature stabilizes itself. The present invention utilizes the fact that even a very high coil current, i.e. a very high magnetic field strength, still requires some time before the coil has reached its maximum temperature. It is accordingly possible in the electronic circuit according to the invention to generate a very high magnetic field strength, provided the data stream need not be continuous. This is because it is possible then to stop the data stream for a certain period when the temperature of the coil has reached its maximum value, or a lower, defined reference temperature, so that the temperature of the coil will fall again. At a later moment, the data stream may be continued until again the maximum temperature is achieved, which process is repeated as described above.

A first embodiment of an electronic circuit according to the invention is characterized in that the electronic circuit further comprises time indicator means for determining a time indication relative to the moment the temporary stopping of the supply of data to the control means was last lifted, said time indication serving as a measure for determining how long the next temporary stopping is to last. It is assumed by way of example that the data control circuit is capable in principle of supplying data continuously to the control means. When the temperature becomes too high, however, the temperature stop signal is generated. This communicates to the data control circuit that the data stream is to be temporarily stopped. As a direct result, the temperature of the coil will start to fall, and the temperature stop signal will be lifted. This lifting of the temperature stop signal may be used in principle for communicating to the data control circuit that the data stream can be resumed. The temperature of the coil, however, is only very slightly lower than the maximum value at the moment the temperature stop signal is lifted. Upon a continuation of the data stream the temperature of the coil will be a maximum again very quickly, which will generate a temperature stop signal again, whereby the data stream is stopped again. Although the electronic circuit can operate correctly in this manner, it is not optimal with regard to the data transfer rate of data from the data control circuit to the control means. This is because the data stream is periodically stopped and restarted again very frequently. This leads to a comparatively low speed of the data transfer on average, inter alia owing to various time delays in electronic components. The time indicator means prevent the data stream from periodically stopping and restarting with a very high frequency. The time indicator means determine a time indication which is a measure for the time that has elapsed between the moment the supply of data to the control means was last stopped and the moment the temperature stop signal is activated again. The time indication may be, for example, the period of time between the two moments mentioned above. This time indication is then used for determining how long the data stream is to be stopped. The period during which no data stream is supplied may be chosen, for example (but definitely not necessarily), to be equal to the time indication mentioned above.

A second embodiment of an electronic circuit according to the invention is characterized in that only the time period during which the data control circuit supplies data to the control means is taken into account in the determination of said time indication. It was assumed in the exemplary description of the first embodiment that the data control circuit is capable in principle of supplying data continuously to the control means. In other words, the data stream is only stopped following a command from the temperature stop signal which is generated when the temperature of the coil has reached its maximum value. It is alternatively possible, however, that the data control circuit (temporarily) stops transmitting data although no temperature stop signal was generated. It may in fact be the case for a variety of reasons that the data control circuit has no data available temporarily. In most cases the first embodiment of the electronic circuit will operate satisfactorily also under these conditions. It is, however, advisable not to take into account the time period during which no data are supplied, but could have been supplied (the temperature of the coil being sufficiently low), in the determination of said time indication. This is because the coil current becomes zero and the coil temperature drops if no data are supplied anymore.

A third embodiment of an electronic circuit according to the invention is characterized in that the time period during which the data control circuit supplies no data to the control means is subtracted in the determination of said time indication. This embodiment is an alternative to the second embodiment. This embodiment is to be preferred to the second embodiment in most applications because it usually has a higher average data transfer rate.

A fourth embodiment of an electronic circuit according to the invention, which is a modification of the third embodiment, is characterized in that the electronic circuit further comprises data detection means for supplying a data presence signal and a processor for receiving the data presence signal and for receiving the temperature stop signal, and in that during operation the processor supplies a stop data signal through processing of the data presence signal and the temperature stop signal and through interaction with the time indicator means, wherein said time indicator means comprise a counter for generating a number which is incremented (decremented) for each clock unit in which data are supplied to the control means and which is decremented (incremented) for each clock unit in which no data are supplied to the control means while the temperature stop signal is inactive, and which number is decremented (incremented) when the temperature stop signal is given to the data control circuit until the number is equal to a reference number, whereupon the stop data signal is lifted. This embodiment is a further modification of the third embodiment.

A fifth embodiment of an electronic circuit according to the invention is characterized in that the coil is a thin-film coil.

A thin-film coil is generally used in magneto-optical recording/playback heads of high-density magneto-optical disc recording/playback devices. In such a device, the recording/playback head is brought very close, for example at a distance of between 1 and 20 microns, to a recording/playback layer of the disc. The maximum magnetic field that can be generated is determined by the temperature of the coil in the recording/playback head. This temperature depends not only on the current strength through the coil. Indeed, if the cooling of the coil by the direct surroundings is improved, its temperature will fall. The current strength may then be chosen to be higher. As a result, the coil can generate a stronger magnetic field. It is found that a very short distance between the coil (recording/playback head) and the disc has a considerable positive effect on the cooling of the coil. How good this cooling is, however, depends on a number of factors such as: the distance between the head and the disc, the type of head, and the speed of rotation of the disc. It is accordingly difficult to predict in general how high the maximum admissible current strength through the coil will be. The use of the present invention is advantageous also for this reason. In fact, the parameter related to the coil temperature is automatically determined without the use of an additional temperature sensor.

Various types of thin-film coils may be used. The international patent application published under publication No. WO 01/82299 A1 from the same applicant as the present patent application provides an example of a particularly advantageous thin-film coil which may be used for the present invention. The coil is shown in FIG. 1 and is extensively described on p. 5, 1. 22 to p., 1. 11 in WO 01/82299 A1. This example in WO 01/82299 A1 of the thin-film coil is deemed to be incorporated in the present patent application.

It should be noted that the electronic circuit according to the invention may be used in appliances other than those mentioned above. The coil may be, for example, a so-called slide coil in an optical CD system.

The invention also relates to a method of controlling a coil current through a coil, wherein a parameter is determined which is a measure for the resistance value of the coil, wherein the coil current is controlled by means of data which are supplied by a data control circuit, and wherein a stop data signal is supplied to the data control circuit for at least temporarily stopping the control of the coil current when the parameter exceeds a certain value.

The invention will be explained in more detail with reference to the accompanying drawing, in which FIG. 1 shows the principle of control means for controlling the coil current in accordance with a prior invention as described in IB 03/02864;

Figure 1:
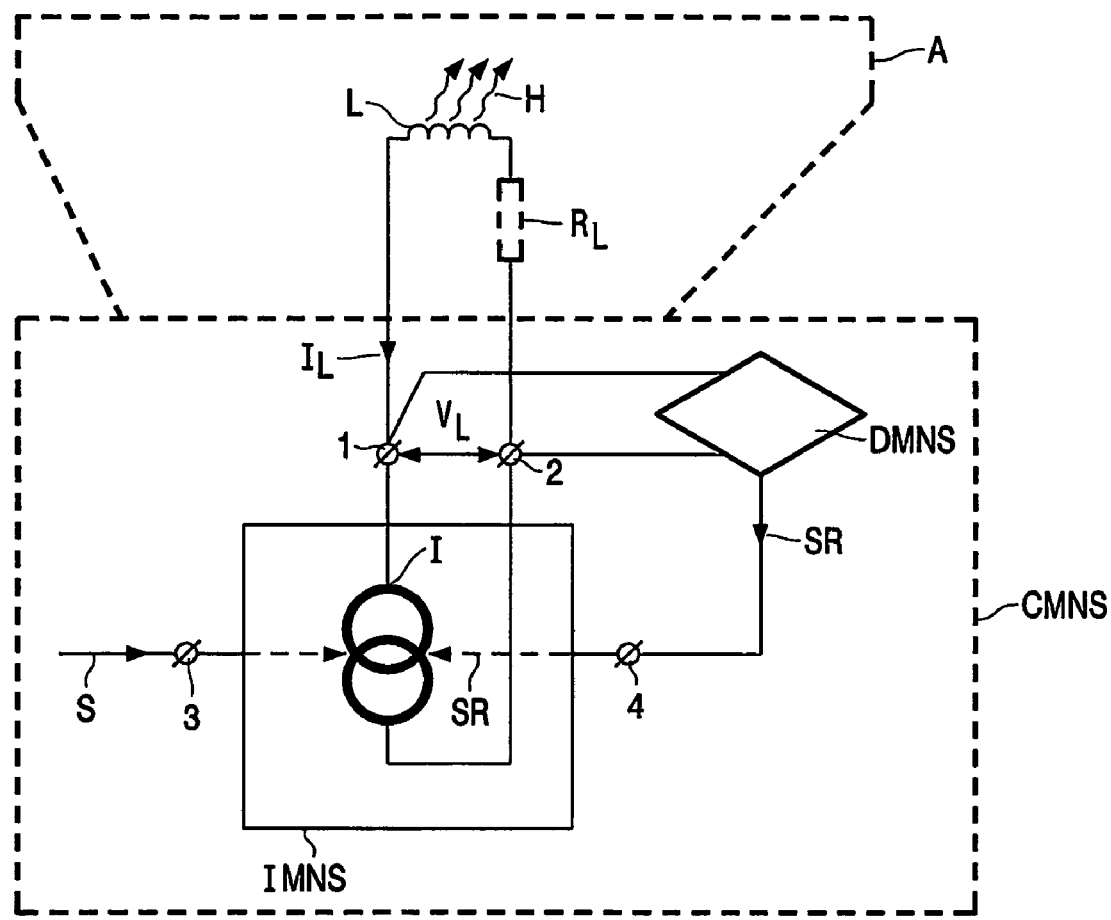
Figure 2:
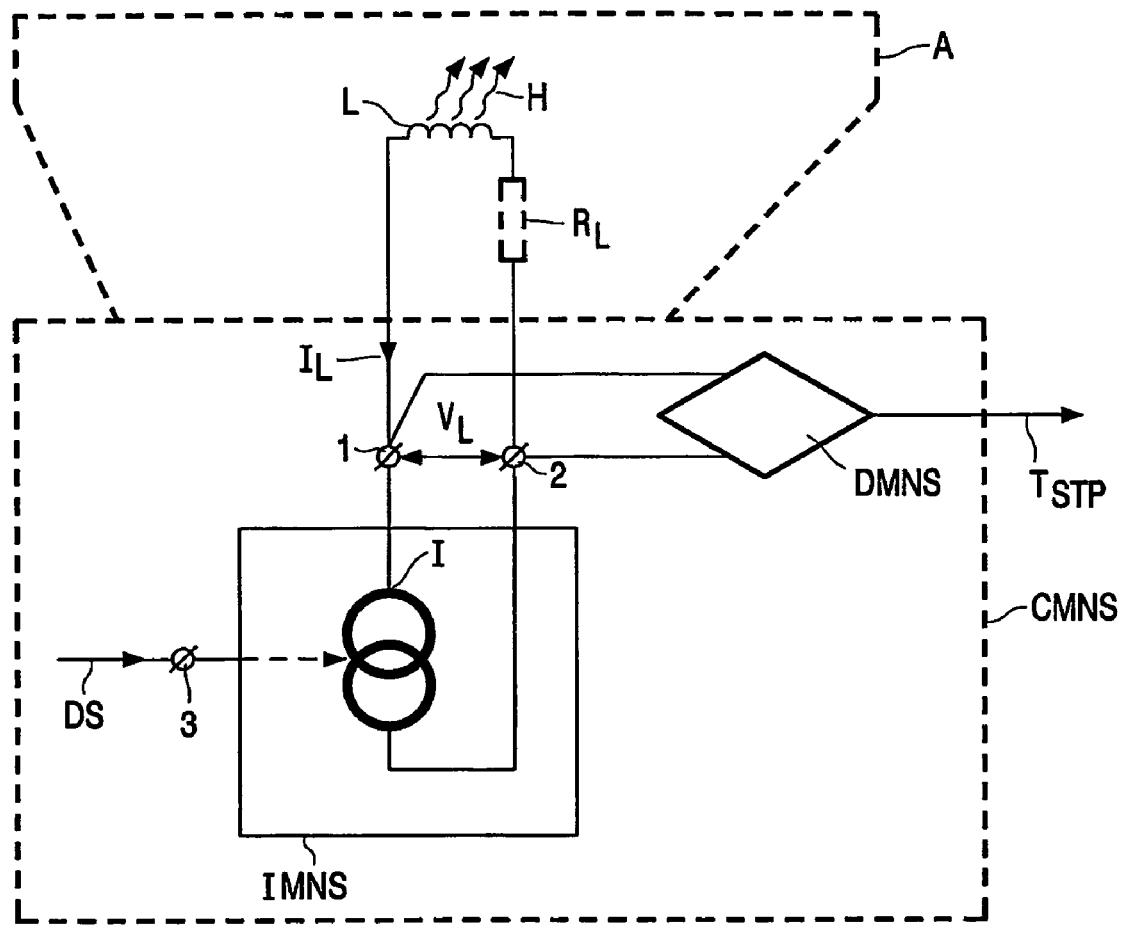
FIG. 2 shows the principle of control means for controlling the coil current according to the invention.
Figure 3:
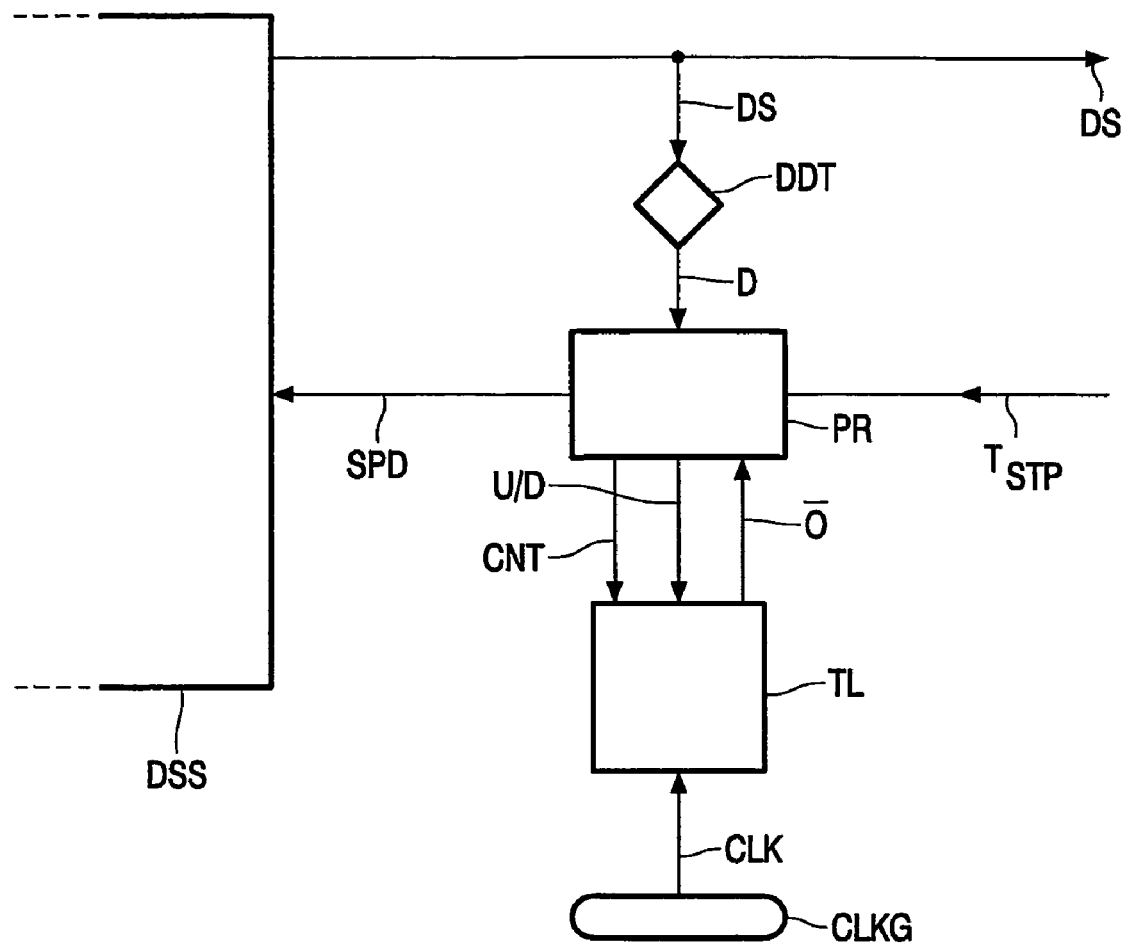
FIG. 3 is a block circuit diagram representing a possible implementation of the electronic circuit according to the invention in conjunction with the control means as shown in FIG. 2.
Figure 4:
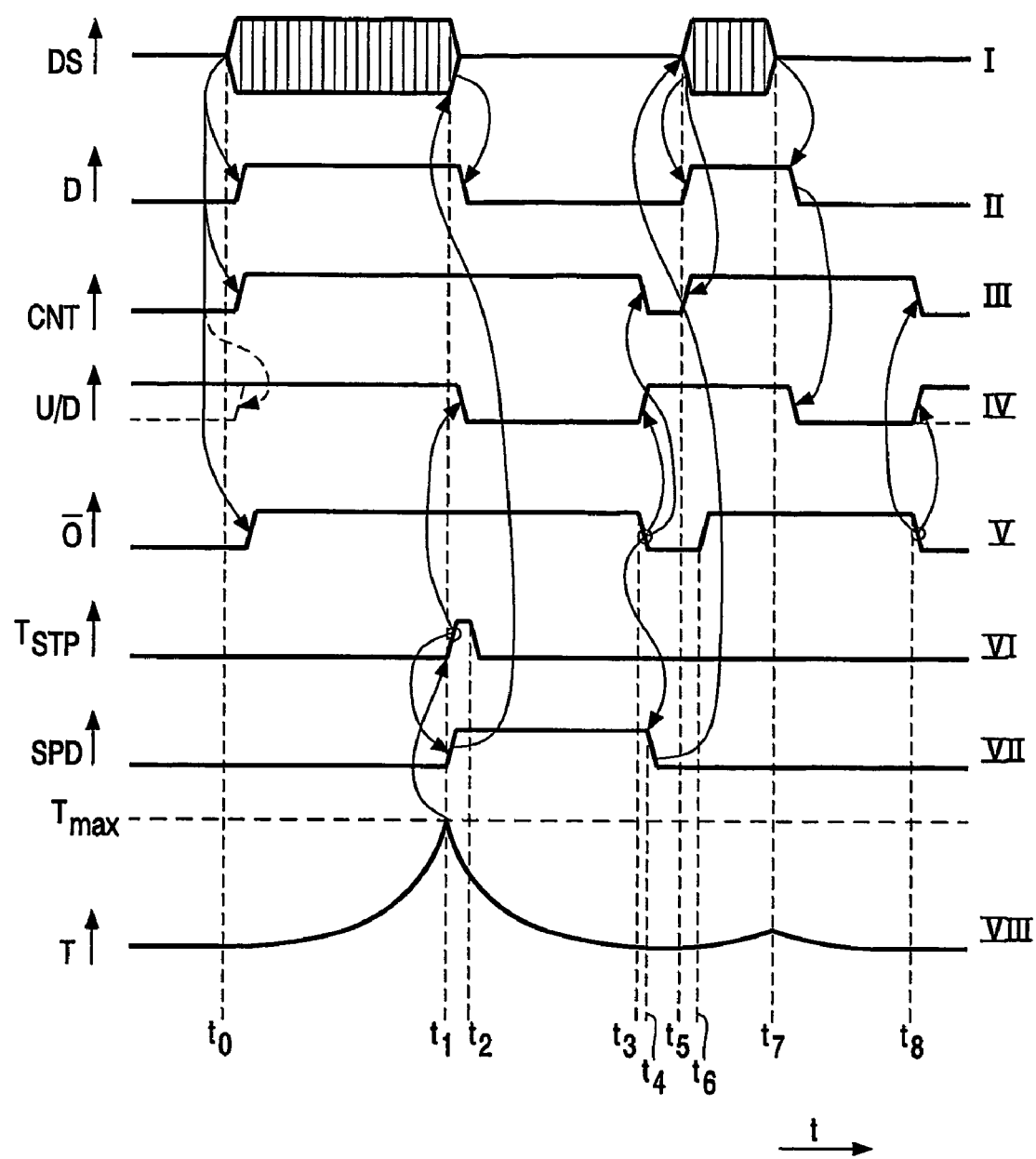
Figure 5:
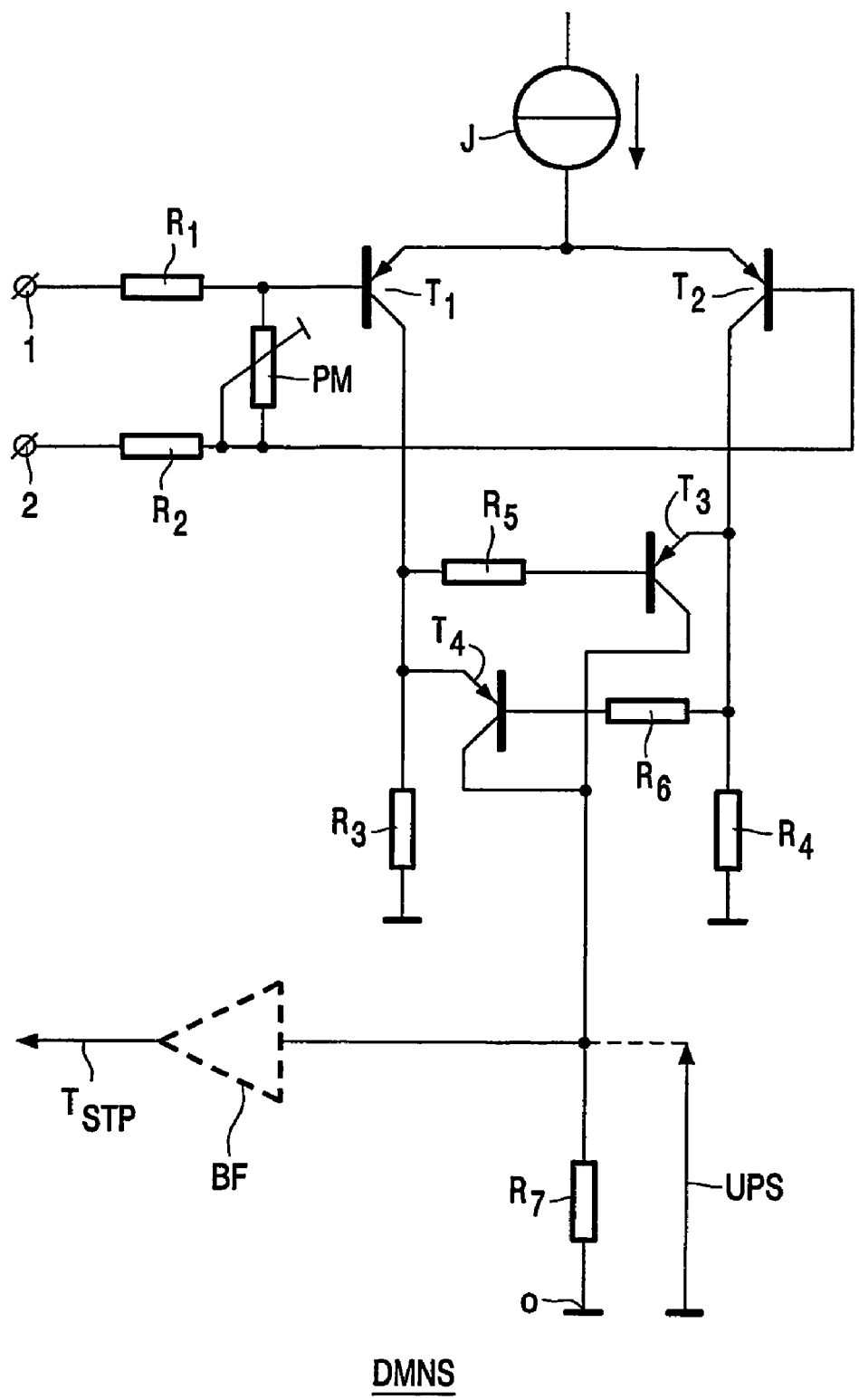
Figure 6:
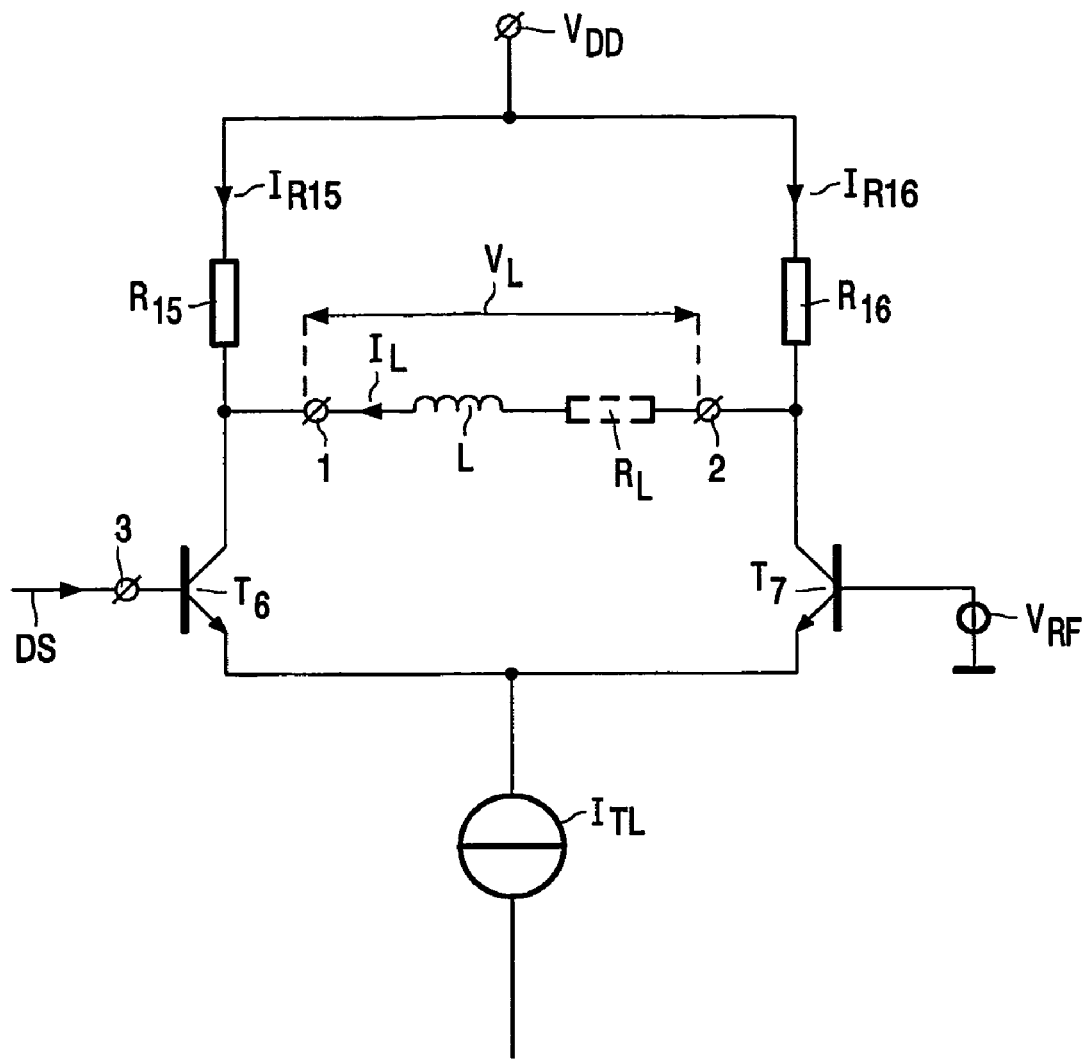

FIG. 4 shows signal diagrams I-VIII for further clarification of the invention with reference to FIGS. 2 and 3, in which I represents a data stream DS, II represents a data presence signal D, III represents a counter signal CNT for indicating whether a counter TL should or should not count, IV represents an "up/down" signal U/D for indicating whether the counter TL should count up or down, V represents a "non-zero" signal $\bar{o}$ for indicating when the counter TL is not at zero, VI represents a temperature stop signal $T_{STP}$ for indicating when the temperature T of a coil L exceeds a certain reference level, VII represents a stop data signal SPD for indicating that the data stream DS is to be stopped, and VIII represents the temperature T of the coil L, i.e. of the magnetic head;

FIG. 5 is a circuit diagram of an embodiment of the detection means DMNS as shown in FIG. 2; and FIG. 6 is a circuit diagram of an embodiment of the current means IMNS as shown in FIG. 2.

Identical components or elements have been given the same reference symbols in FIGS. 2 to 6.

FIG. 2 shows the principle of control means CMNS for controlling the coil current $I_L$ used in an appliance A such as a magneto-optical disc recording/playback device. The control means CMNS comprise current means IMNS with an input terminal 3 for receiving an input signal, i.e. a data stream DS, and first and second output terminals 1 and 2 for providing a coil current $I_L$ through a coil L which is connected between the output terminals 1 and 2. The series resistance $R_L$ of the coil L is indicated with broken lines. The control means CMNS further comprise detection means DMNS which measure a coil voltage $V_L$ between the terminals 1 and 2 and which supply a temperature stop signal $T_{STP}$ in response thereto.

Writing of information onto a magneto(-optical) disc in the appliance A takes place through generation of positively and negatively directed magnetic field strengths H originating from the coil L. The magnetic field H is generated through control of the current $I_L$ through the coil L. The coil current $I_L$ is supplied by the current source I. The information is contained in the data stream DS. The data stream DS is preferably a voltage that can assume three levels: a zero level for indicating that there are no data, a positive level, and a negative level, for example for indicating that the data have a logic "1" or "0" level. It is alternatively possible to make the data stream binary. There will be no separate level then to indicate that there are no data.

The value of the series resistance $R_L$ of the coil L increases with an increase in temperature of the coil L. This renders it possible to determine a parameter that is dependent on said resistance value, and is thus temperature-dependent. The parameter may be a direct reflection of the resistance value of the series resistance $R_L$, i.e. the parameter is equal to the resistance value of the series resistance $R_L$. This, however, is not strictly necessary. An alternative relation between the parameter and the resistance value of the series resistance $R_L$ is also possible. (For example, the parameter may rise with the square of the resistance value of the series resistance $R_L$.) The detection means DMNS thus ensure that the temperature stop signal $T_{STP}$ assumes a logic level "1" when the temperature has reached the maximum value or some other, lower reference value. As a direct result thereof, a stop data signal SPD in a data control circuit DSS (see FIG. 3) is set for logic "1", whereby the data stream DS is stopped (the data stream has a zero value).

FIG. 3 is a block circuit diagram showing a possible implementation of the electronic circuit according to the invention in conjunction with the control means as shown in FIG. 2. The block diagram shows the data control circuit DSS, a processor PR, a data detector DDT which derives from the data stream DS a data presence signal D and supplies it to the processor PR, time indicator means implemented as a counter TL, and a clock generator CLKG for supplying a clock signal CLK to the counter TL. The data stream DS usually has an amplitude of plus and minus a few hundreds of millivolts around a zero level (so in fact there are three levels). The data detector DDT may be implemented, for example, (substantially) as a full-wave rectifier. It is alternatively possible in principle that the data stream DS can assume only two voltage levels. In that case a half-wave rectifier can suffice. However, additional measures are to be taken then in the electronics so as to ensure that the coil current $I_L$ is switched off when there is no data stream DS present.

The processor PR can supply a stop data signal SPD through processing of the data presence signal D and the temperature stop signal $T_{STP}$ and through interaction with the counter TL, which increments a number in every clock unit during which data DS are supplied to the control means CMNS and decrements this number in every clock unit during which no data DS are supplied to the control means CMNS while the temperature stop signal $T_{STP}$ is inactive, whereas said number is decremented when the temperature stop signal $T_{STP}$ is supplied to the data control circuit DSS until the number is equal to a reference number (for example zero), whereupon the stop data signal SPD is lifted. The processor PR supplies to the counter TL a counter signal CNT for indicating whether the counter should count upwards or downwards. The processor PR also supplies to the counter TL the so-called "up/down" signal U/D for indicating whether the counter TL is to count up or down, provided counting has to take place. The counter supplies the so-called "non-zero" signal $\bar{o}$ for indicating that the counter TL is not at zero (it is assumed here that the reference number referred to above is chosen to be the number zero).

The operating principle of the invention in general, and in particular of the implementation of FIGS. 2 and 3, will now be discussed in more detail with reference to the signal diagrams I to VIII of FIG. 4.

Consider the initial state (up to moment $t_0$): there is no data stream DS yet (i.e. DS has the zero level), while the temperature T is lower than the maximum value $T_{max}$ (reference temperature). In short, the data control circuit DSS simply has no data yet to be sent. The result is: the data presence signal D is "0" and the counter signal CNT is "0", because no counting takes place yet. The "up/down" signal U/D is at "1". This is the default value, but U/D is also allowed to be at "0" (see the solid lines), because counting does not take place yet anyway. The "non-zero" signal $\bar{o}$ is at "0": no counting has taken place yet and the counter TL is accordingly at zero, which is indicated as a high value, i.e. "1", so the inverse thereof, being o, is at "0". The temperature stop signal $T_{STP}$ is at "0", because the temperature T is not too high ($<T_{max}$), and accordingly the stop data signal SPD is at "0", indicating that DSS is allowed to supply data again.

At moment $t_0$, DSS starts sending DS. Result: D becomes "1", CNT becomes "1", so that the counter TL is started, U/D becomes (see solid lines) (or remains) "1", so that the counter TL is in the "up/mode". Since the counter TL now counts upwards, $\bar{o}$ becomes "1" after some time, because the counter TL is no longer at zero now. T starts rising, but it is not too high for the present, and accordingly $T_{STP}$ remains "0" and SPD remains "0", indicating that DSS is not obliged to stop DS.

At moment $t_1$, T reaches its maximum value $T_{max}$. Result: $T_{STP}$ becomes "1" and SPD becomes "1", owing to which DS is stopped. U/D becomes "0", so that counting takes place in downward direction from this moment. It is not until the counter TL reaches zero again, i.e. the $\bar{o}$ becomes "0" again (moment $t_3$), that SPD becomes "0" again (moment $t_4$), owing to which DS is allowed to continue again, so that D becomes "1", and U/D also becomes "1" again. Since $\bar{o}$ is "0", CNT becomes "0" again (otherwise the counter TL would get a negative value), and no counting takes place. This is of short duration, however, because SPD has become "0" so that after some delay DS has been resumed (moment $t_5$) and accordingly CNT becomes "1" again, and counting upwards is resumed (for U/D had become "1" again). (CNT is "0" for a short period only because the above delay is short).

$T_{STP}$ had become "0" (moment $t_2$) long before SPD became "0", because T had become lower than $T_{max}$ again, but this has no influence on SPD (otherwise DS would be switched on and off with a much too high frequency, which has a negative influence on the eventual average speed of DS).

It is further indicated (but the gradient may alternatively be different) that DS stops (moment $t_7$, D now becomes "0") while T is not yet a maximum ($T_{STP}$ is still "0"). This is simply due to the fact that there is momentarily no DS to be transmitted. The counter TL, however, keeps counting (CNT remains high), but no longer upwards but downwards (U/D becomes "0"). This is because T starts falling again owing to the fact that DS was stopped (while T had not yet reached the maximum $T_{max}$).

At moment $t_8$, $\overline{o}$ becomes "0" again. U/D becomes "1" again (or remains "0"; see the broken lines), and CNT becomes "0" again.

This now continues, for example, as from the initial state above.

FIG. 5 is a circuit diagram of an embodiment of the detection means DMNS as shown in FIG. 2. The detection means DMNS comprise: a current source J, bipolar transistors $T_1$ to $T_4$, resistors $R_1$ to $R_7$, and an adjustment potentiometer PM. The bases of transistors $T_1$ and $T_2$ are connected to terminals 1 and 2, respectively, via respective resistors $R_1$ and $R_2$. The adjustment potentiometer PM is connected between the bases of transistors $T_1$ and $T_2$. The collectors of the transistors $T_1$ and $T_2$ are connected to terminal 0 (i.e. ground) via respective resistors $R_3$ and $R_4$. The emitters of transistors $T_1$ and $T_2$ are interconnected in a common junction point which is coupled to the current source J. The emitter of transistor $T_3$ is connected to the collector of transistor $T_2$. The base of transistor $T_3$ is connected via the resistor $R_5$ to the collector of transistor $T_1$. The emitter of transistor $T_4$ is connected to the collector of transistor $T_1$. The base of transistor $T_4$ is connected via the resistor $R_6$ to the collector of transistor $T_2$. The collectors of transistors $T_3$ and $T_4$ are interconnected. The resistor $R_7$ is coupled between the collector of transistor $T_3$ and ground.

The operation of the circuit is as follows. The combination of transistors $T_1$ to $T_4$, resistors $R_3$ and $R_4$, and the current source J forms a so-called differential amplifier. The combination of resistors $R_1$ and $R_2$ and adjustment potentiometer PM forms a voltage divider. The voltage between the terminals 1 and 2, i.e. the voltage $V_L$ across the coil L, is attenuated by the voltage divider. The attenuated voltage (across the adjustment potentiometer PM) forms a differential input voltage for the differential amplifier. The value of the differential input voltage is adjusted with the adjustment potentiometer PM. The effective voltage transfer (amplified or attenuated) from the coil voltage $V_L$ to a differential output voltage (between the collectors of transistors $T_1$ and $T_2$) can thus be adjusted. The combination of transistors $T_3$ and $T_4$, resistors $R_5$ and $R_6$, and resistor $R_7$ forms a conversion means which converts the differential output voltage into a unipolar voltage UPS across the resistor $R_7$. The voltage UPS being unipolar means that the polarity of the voltage UPS is always the same, i.e. is not dependent on the polarity of the coil voltage $V_L$. It should be noted that the conversion means can only generate the unipolar voltage UPS if the differential output voltage is sufficiently high. This is because the transistor $T_3$ or $T_4$ can only become significantly conducting when its base-emitter voltage lies above the so-called threshold voltage. Whether or not the unipolar voltage UPS is generated depends on the value of the coil voltage $V_L$, the dimensioning of the resistors $R_1$ to $R_6$, and the setting of the adjustment potentiometer PM. Since the value of the coil voltage $V_L$ depends on the resistance value $R_L$ (see FIG. 2) of the coil L, which in its turn depends on the temperature T of the coil L again, the setting of the adjustment potentiometer PM can be chosen such that the unipolar voltage UPS is generated when a given reference temperature is exceeded. The reference temperature may be, for example, equal to the maximum admissible temperature $T_{max}$ of the coil L, or it may alternatively be lower. The temperature stop signal $T_{STP}$ is derived from the unipolar voltage UPS with the use of a buffer BF. The buffer BF is optional. It is possible in principle, given a correct dimensioning (inter alia the choice of the resistance value of $R_7$), for the signal UPS to act as the temperature stop signal $T_{STP}$. The use of the buffer BF, however, renders it possible to adapt the voltage levels of the temperature stop signal $T_{STP}$, if so desired. Another advantage of the use of the buffer BF is that the voltage UPS is not influenced when current is to be supplied from the temperature stop signal $T_{STP}$. Furthermore, the buffer BF may be constructed as an inverter, if so desired.

FIG. 6 is a circuit diagram of an embodiment of the current means IMNS as shown in FIG. 2. The current means IMNS comprise a tail current source $I_{TL}$, bipolar transistors $T_6$ and $T_7$, and resistors $R_{15}$ and $R_{16}$. The collectors of the transistors $T_6$ and $T_7$ are connected to the terminals 1 and 2, respectively. The base of transistor $T_6$ is connected to the terminal 3. The tail current source $I_{TL}$ is coupled to the common junction point of the emitters of transistors $T_6$ and $T_7$. A voltage reference source $V_{RF}$ is connected between the base of transistor $T_7$ and ground. The voltage reference source $V_{RF}$ is optional and may be replaced by a short-circuit in most applications. The terminals 1 and 2 are connected to the supply terminal $V_{DD}$ via the resistors $R_{15}$ and $R_{16}$, respectively.

The circuit operates as follows. The circuit substantially forms a differential amplifier. The input signal DS, which contains the information to be written onto a disc in an appliance A (see also FIG. 2), brings the transistors $T_6$ and $T_7$ alternately into the conducting and non-conducting states. The data stream DS has three voltage levels with respect to ground, as shown in diagram I of FIG. 4: a logic "1" (highest positive voltage), a logic "0" (lowest negative voltage), and a zero level (0 volts). At a logic "1", the transistor $T_6$ is conducting and the transistor $T_7$ is blocked, whereas at a logic "0" the transistor $T_7$ is conducting and the transistor $T_6$ is blocked. Both the transistor $T_6$ and the transistor $T_7$ are blocked at a zero level, so that the tail current source $I_{TL}$ cannot supply a current (i.e. is in saturation). In the situation shown, the coil current $I_L$ has the current direction indicated because the potential at terminal 3; which is determined by the input signal DS, is substantially higher (DS is "1") than the potential at the base of transistor $T_7$, which is determined by the voltage originating from the voltage reference source $V_{RF}$ (for example 0 volts). The tail current $I_{TL}$ in the situation shown flows in its entirety through the emitter of transistor $T_6$. The current strength of the coil current $I_L$ is equal to that of the current through the collector (which is substantially equal to the current through the emitter) of transistor $T_6$ minus the current $I_{R15}$ flowing through the resistor $R_{15}$.

The bipolar transistors in the control means CMNS may be replaced wholly or in part by field effect transistors. Different conductivity types may be used for the transistors. The polarities of voltages and/or currents and/or logic levels are then to be adapted, as applicable.

The electronic circuits may be composed both as integrated circuits and by means of discrete components. Logic "1" and logic "0" signals may also be their respective opposites, given a suitable dimensioning of the electronic circuits. It is even possible for a portion of the logic "1" and logic "0" signals to be opposite. The counting upwards and downwards of the counter TL may also be reversed, given a correct dimensioning. The reference number of the counter TL may have a value other than the zero value.

The invention claimed is:

1. An electronic circuit comprising control means (CMNS) for controlling a coil current (IL) through a coil (L) for the generation of a magnetic field (H), a data control circuit (DSS) coupled to the control means (CMNS) for supplying data (DS) to the control means (CMNS), wherein the control means (CMNS) comprise detection means (DMNS) for determining a temperature parameter which is a measure for the resistance value (RL) of the coil (L) and for supplying a temperature stop signal (TSTP) for at least temporarily stopping the supply of data (DS) to the control means (CMNS) when said temperature parameter has exceeded a given value.

2. An electronic circuit as claimed in claim 1, characterized in that the electronic circuit further comprises time indicator means for determining a time indication relative to the moment the temporary stopping of the supply of data (DS) to the control means (CMNS) was last lifted, said time indication serving as a measure for determining how long the next temporary stopping is to last.

3. An electronic circuit as claimed in claim 2, characterized in that only the time period during which the data control circuit (DSS) supplies data (DS) to the control means (CMNS) is taken into account in the determination of said time indication.

4. An electronic circuit as claimed in claim 2, characterized in that the time period during which the data control circuit (DSS) supplies no data DS) to the control means (CMNS) is subtracted in the determination of said time indication.

5. An electronic circuit as claimed in claim 4, characterized in that the electronic circuit further comprises data detection means (DDT) for supplying a data presence signal (D), and a processor (PR) for receiving the data presence signal (D) and for receiving the temperature stop signal (TSTP), and in that during operation the processor (PR) supplies a stop data signal (SPD) through processing of the data presence signal (D) and the temperature stop signal (TSTP) and through interaction with the time indicator means, wherein said time indicator means comprise a counter (T) for generating a number which is incremented (decremented) for each clock unit during which data (DS) are supplied to the control means (CMNS) and which is decremented (incremented) for each clock unit during which no data (DS) are supplied to the control means (CMNS) while the temperature stop signal (TSTP) is absent, and which number is decremented (incremented) when the temperature stop signal (TSTP) is given to the data control circuit (DSS) until the number is equal to a reference number, whereupon the stop data signal (SPD) is lifted.

6. An electronic circuit as claimed in claim 1, characterized in that the coil (L) is a thin-film coil.

7. An appliance (A) comprising an electronic circuit as defined in claim 1.

8. A magneto-optical disc recording/playback appliance (A) comprising an electronic circuit as defined in claim 1.

9. A method of controlling a coil current through a coil, wherein a temperature parameter is determined which is a measure for the resistance value of the coil, wherein the coil current is controlled by means of data which are supplied by a data control circuit, and wherein a temperature stop data signal is supplied to the data control circuit for at least temporarily stopping the control of the coil current when the temperature parameter exceeds a certain value.

* * * * *